(12) United States Patent
Bechar et al.

(10) Patent No.: US 12,232,489 B2
(45) Date of Patent: Feb. 25, 2025

(54) DEVICE FOR PERFORMING ELECTROSTATIC WEEDING

(71) Applicant: The State of Israel, Ministry of Agriculture & Rural Development, Agricultural Research Organization, Rishon Lezion (IL)

(72) Inventors: Avital Bechar, Mazkeret Batya (IL); Ran Lati, Kfar Tavor (IL); Lavi Rosenfeld, Rishon LeZion (IL)

(73) Assignee: THE STATE OF ISRAEL, MINISTRY OF AGRICULTURE & RURAL DEVELOPMENT, AGRICULTURAL RESEARCH ORGANIZATION, Rishon Lezion (IL)

( * ) Notice: Subject to any disclaimer, the term of this patent is extended or adjusted under 35 U.S.C. 154(b) by 224 days.

(21) Appl. No.: 17/426,177

(22) PCT Filed: Jan. 28, 2020

(86) PCT No.: PCT/IB2020/050646
§ 371 (c)(1),
(2) Date: Jul. 28, 2021

(87) PCT Pub. No.: WO2020/157647
PCT Pub. Date: Aug. 6, 2020

(65) Prior Publication Data
US 2022/0095604 A1    Mar. 31, 2022

Related U.S. Application Data

(60) Provisional application No. 62/797,395, filed on Jan. 28, 2019.

(51) Int. Cl.
*A01M 21/04* (2006.01)

(52) U.S. Cl.
CPC ................. *A01M 21/046* (2013.01)

(58) Field of Classification Search
CPC ........ A01M 1/02; A01M 21/02; A01M 21/04; A01M 21/046; A01M 21/00; A01B 49/00
See application file for complete search history.

(56) References Cited

U.S. PATENT DOCUMENTS

| 2,484,443 | A | * | 10/1949 | Baker | ................. A01M 21/046 47/1.3 |
| 2,607,165 | A | * | 8/1952 | Rainey | ................... A01B 41/06 47/1.3 |

(Continued)

FOREIGN PATENT DOCUMENTS

| EP | 3415004 A1 | * | 12/2018 | .......... A01M 21/046 |
| EP | 3912469 A1 | * | 11/2021 | .......... A01M 21/046 |

(Continued)

*Primary Examiner* — Ebony E Evans
(74) *Attorney, Agent, or Firm* — Rivka Friedman (57) ABSTRACT

A method for weed control, including: (a) providing an electrode coupled to a power source via a power provision arrangement; and (b) delivering an electrostatic shock on or near a weed plant via the electrode. A device for performing electrostatic weeding, including: (a) an electrode; (b) a handle, coupled to the electrode; and (c) a power provision arrangement operationally coupled to a power source, the power provision arrangement being in electrical communication with the electrode; wherein the electrode is adapted to provide an electrostatic shock to a weed plant so as to damage or destroy the weed plant.

19 Claims, 9 Drawing Sheets

(56) References Cited

U.S. PATENT DOCUMENTS

| | | | | |
|---|---|---|---|---|
| 3,477,011 A | * | 11/1969 | Westwood | H02M 7/10 |
| | | | | 363/45 |
| 4,338,743 A | * | 7/1982 | Gilmore | A01M 21/046 |
| | | | | 47/1.3 |
| 4,758,318 A | * | 7/1988 | Yoshida | A01M 21/046 |
| | | | | 47/1.3 |
| 6,237,278 B1 | * | 5/2001 | Persson | A01M 21/046 |
| | | | | 47/1.3 |
| 2015/0027044 A1 | * | 1/2015 | Redden | A01G 7/06 |
| | | | | 47/58.1 R |
| 2018/0055036 A1 | | 3/2018 | Diprose | |
| 2018/0132473 A1 | * | 5/2018 | Diprose | A01M 21/046 |
| 2019/0320641 A1 | | 10/2019 | Rona et al. | |

FOREIGN PATENT DOCUMENTS

| | | | | |
|---|---|---|---|---|
| JP | H05168390 A | | 7/1993 | |
| JP | H07170899 A | | 7/1995 | |
| JP | 2002186324 A | | 7/2002 | |
| KR | 20100108780 A | * | 10/2010 | ............ A01M 17/00 |
| RU | 2431956 C1 | * | 10/2011 | ............ A01G 13/00 |
| WO | WO-2015119523 A1 | * | 8/2015 | ......... A01M 21/046 |
| WO | WO-2019102243 A1 | * | 5/2019 | ......... A01M 21/046 |

* cited by examiner

DEVICE FOR PERFORMING ELECTROSTATIC WEEDING

FIELD OF THE INVENTION

The present invention relates to the field of agriculture and in particular to the sub-category of weed control.

BACKGROUND OF THE INVENTION

Weeds are the main biotic factor threatening the production and profitability of field and vegetable crops worldwide. Weeds have the highest loss potential (32%) compared to other pest (e.g., insects and viruses), and therefore, to achieve high yields in agricultural crop systems, successful weed control is essential.

SUMMARY OF THE INVENTION

The present invention successfully manages to provide a system for high voltage weeding. The system is a weeding tool and technique which is non-chemical, environment friendly and site specific.

According to the present invention there is provided a method for weed control, including: (a) providing an electrode coupled to a power source via a power provision arrangement; and (b) delivering an electrostatic shock on or near a weed plant via the electrode.

According to further features in preferred embodiments of the invention described below the electrode communicates/conducts an AC current or a DC current.

According to still further features in the described preferred embodiments the method further includes providing an AC current from the power source; and converting the AC current to the DC current by the power provision arrangement prior to delivering the electrostatic shock. According to further features the method further includes providing a DC current from the power source; and converting the DC current to the AC current by the power provision arrangement prior to delivering the electrostatic shock.

According to further features the electrostatic shock is delivered to a leaf or stem of the weed plant either by direct contact therewith or at a distance from the leaf or stem while maintaining a constant discharge between the electrode and the leaf or stem.

According to further features the electrostatic shock is delivered for a duration of time between two seconds and twenty seconds. According to further features the electrostatic shock is delivered for two seconds.

According to further features the electrostatic shock is delivered any time after emergence of the weed plant. According to further features the electrostatic shock is delivered at a growth stage of between two weeks and six weeks. According to further features the electrostatic shock is delivered at a growth stage of two weeks.

According to further features the power source is selected from the group comprising: an electricity grid and a battery. According to further features the electrode delivers a shock between 3 and 40 kV of DC or 2500V of AC.

According to another embodiment there is provided a device for performing electrostatic weeding, including: (a) an electrode; (b) a handle, coupled to the electrode; and (c) a power provision arrangement operationally coupled to a power source, the power provision arrangement being in electrical communication with the electrode; wherein the electrode is adapted to provide an electrostatic shock to a weed plant so as to damage or destroy the weed plant.

According to further features the power provision arrangement includes an electrical cable. According to further features the power provision arrangement further includes a component selected from the group including: a transformer, a converter, and a combination thereof.

According to further features the transformer is selected from the group of: an AC to AC transformer and a DC to DC transformer; and wherein the converter is selected from the group of: AC to DC converter and a DC to AC converter.

According to the present invention there is provided a method of using electrostatic shocks in the control of a weed population, including: providing an electrostatic shock to a weed plant so as to damage or kill the weed plant.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of device and method for electrostatic weeding according to the present invention may be better understood with reference to the drawings and the accompanying description.

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Before explaining at least one embodiment of the invention in detail, it is to be understood that the invention is not necessarily limited in its application to the details of construction and the arrangement of the components and/or method set forth in the following description and/or illustrated in the drawings and/or Examples. The invention is capable of other embodiments or of being practiced or carried out in various ways.

The present invention provides a system for electrostatic weeding, preferably high voltage weeding. The system is a weeding tool and technique which is non-chemical, environment friendly and site specific. The use of electrostatic systems effectively damages and controls a weed population in safe and efficient way.

The device produces a electric current that passes to the weed and causes anywhere between permanent damage to complete destruction of the weed. The unique development of the device requires only one contact point on the plant or close to it with only one electrode which makes the operation much faster and more accurate.

Attention is now directed to the drawings, where like reference numerals or characters indicate corresponding or like components.

Figure 1:
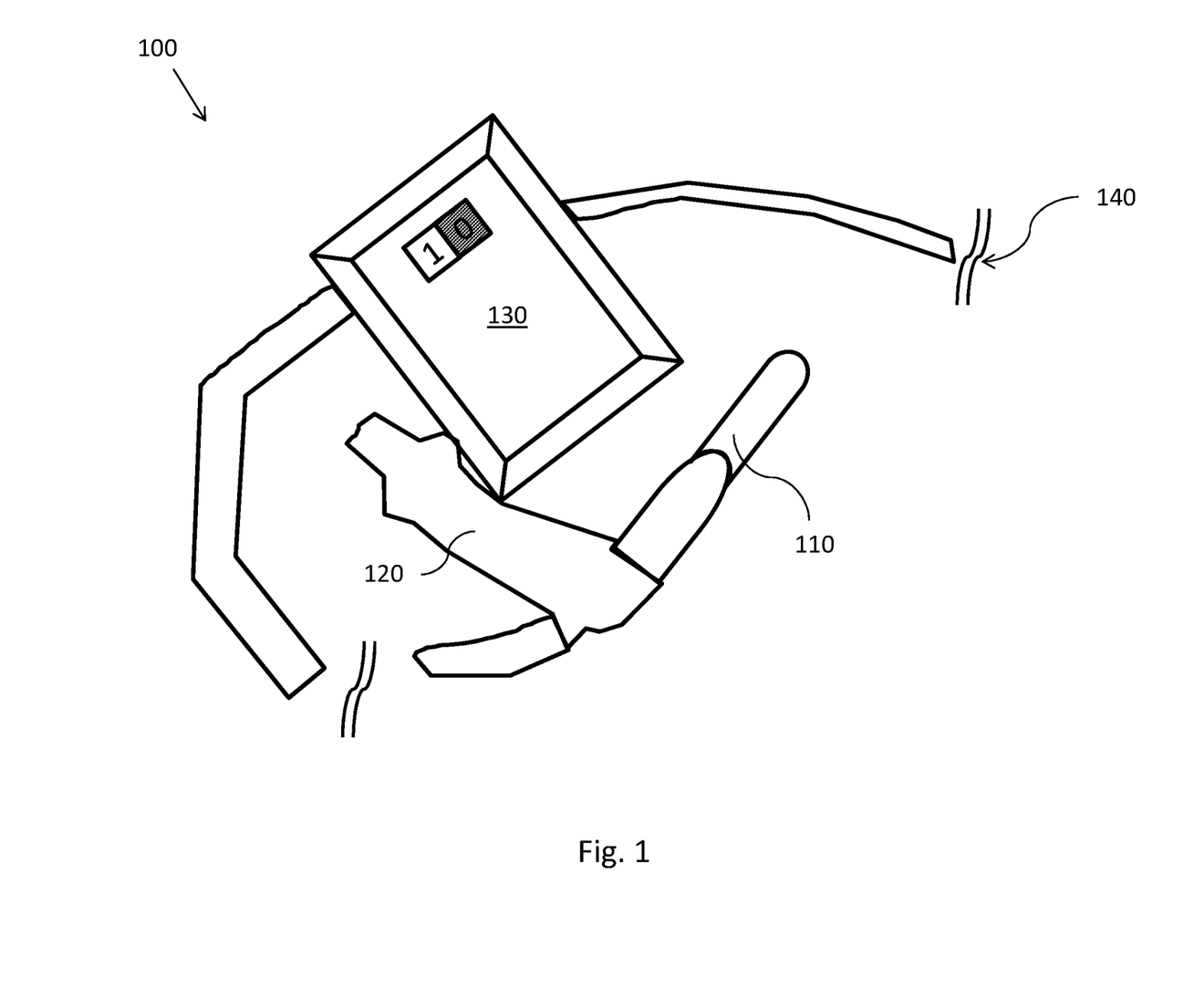
FIG. 1 is a pictorial depiction of a device for performing electrostatic weeding.

FIG. 1 illustrates a device 100 for performing electrostatic weeding. The device includes an electrode 110, a handle 120 and a power provision arrangement 130 operationally coupled to a power source 140. The electrode can be, for example, a 40 kV DC electrode, a 2500V AC electrode or similar. The power source can be, for example, a 220V AC source, a 12V battery and the like.

The preferred range of Direct Current (DC) is between 10 and 80 kV. More preferably, the range of DC is between 30-40 kV. In one embodiment, the present invention entails a manual device including a high voltage 40 kV DC electrode 110. The device is connected to a 12V battery 140 and a transformer 130 that increases the electric potential to between 3 and 40 kV.

The preferred range of Alternating Current (AC) is between approximately 200 volts to 5000 volts. Theoretically, much higher voltage can be used but such usage would require greater energy consumption and increased general cost all round (energy and devices). It is also not necessary. A more preferred range of AC is between 2000 and 3000 V. In another embodiment, the present invention entails a manual device including a 2500 V AC electrode 110 fed from a 220 V AC source 140 (e.g. an electricity grid). It is to be understood that the embodiments disclosed are the preferred, but in no way the only, manners of implementing the innovative device. The use of converters from AC to DC and DC to AC are considered to be within the scope of the innovation. So too are transformers that increase (or decrease) electrical potential for AC and DC.

In preferred embodiments, an electrode coupled to a power source via a power provision arrangement is provided. The electrode is adapted for delivering an electrostatic shock on or near a weed plant via. Preferably, the electrode is a high voltage electrode. Different electrical conductors may be used in place of, or in addition to the electrode. The electrode communicates or conducts an AC or DC current.

As mentioned, in some embodiments, an AC current is provided from a power source and converted, by the power provision arrangement (converter) to a DC current prior to delivering the electrostatic shock. In other embodiments, a DC current is provided from a power source and converted, by the power provision arrangement (converter) to an AC current prior to delivering the electrostatic shock.

The power provision arrangement 130 can be embodied in a power cord, a transformer, a converter or any combination thereof. The handle 120 may be embodied in a grip with a short shaft or arm on which the electrode 110 is disposed. Alternatively, the arm may be elongated (for better reach, easier use) and may be of a static or dynamic (e.g. telescopic) length. The handle may be embodied on a robot for automated weeding. For example, roving/mobile robots may be employed to weed large produce-growing plots of land.

EXAMPLES

The following examples are not meant to limit the scope of the claims in any way. The following examples are put forth so as to provide those of ordinary skill in the art with a complete disclosure and description of how to make and use the described invention, and are not intended to limit the scope of the invention, nor are they intended to represent that the experiments below are all or the only experiments performed. Unless indicated otherwise, parts are parts by weight, molecular weight is weight average molecular weight, temperature is in degrees Centigrade, and pressure is at or near atmospheric.

Several experiments with the two embodiments were conducted in order to characterize the different influencing factors on the weeding level and define the optimal weeding protocol and device operation (Table 1).

TABLE 1

The weeding experiments.

| Exp. No. | Factors | treatment |
|---|---|---|
| 1 | Weed type, weed contact point, electrode application type | Plant types: watermelon (*Citrullus lanatus*), common purslane (*Portulaca oleracea*), johnson grass (*Sorghum halepense*) and redroot pigweed (*Amaranthus retroflexus*) Contact point: leaf, stem, direct contact or at a distance |
| 2 | Weed type, Exposure time Voltage | Plant types: watermelon (*Citrullus lanatus*), common purslane (*Portulaca oleracea*), johnson grass (*Sorghum halepense*) and redroot pigweed (*Amaranthus retroflexus*) Exposure time: 5, 10, 15 s Voltage: 40 kV |
| 3 | Weed type, Exposure time Plant growing stage electrode application type | Plant types: mustard (*Sinapis alba*), rigid ryegrass (*Lolium rigidum*) and red clover (*Trifolium pratense*) Growing stage: 2 weeks, 1 month and 1.5 month after seedling Exposure time: 2, 5, 10, 20 s (in accordance to the plant type and growing stage, direct contact or at a distance |
| 4 | Moisture content | Soil moisture: 100% and 50% field capacity Growth stage: 2 and 4 weeks after planting. |

In all experiments, 4 seeds were planted in 0.25 L pots. One week after emergence, seeded weeds were thinned to one plant per pot. Pots were placed in a net-house and irrigated and fertilized as needed to avoid any stresses. Two weeks after treatments the above ground parts of the plants were clipped and placed in 65° C. oven for 72 hours. Then, the dry weight (biomass) values were evaluated. Statistical analysis: dry weight values were subjected to an Analysis of Variance (ANOVA) tests (Tukey-Kramer Honestly Significant Difference test P<0.05). A one-way ANOVA was conducted to determine the effect of treatments on weeds dry weight. In Ex. 4 a two-way ANOVA was conducted to determine the interaction between soil moisture and growth stage on the weed dry weight.

Example 1

Experiment 1 examines the electrostatic operation mode that will cause the maximum damage to the plants. Two contact points were tested, one on the leaf and one on the main stem. In addition, two application methods were examined: one in direct contact with the plant leaf or stem and the other at a distance of few centimeters between the plant and the electrode in a way that maintained a constant discharge (spark) between the electrode and the plant.

Figure 2:
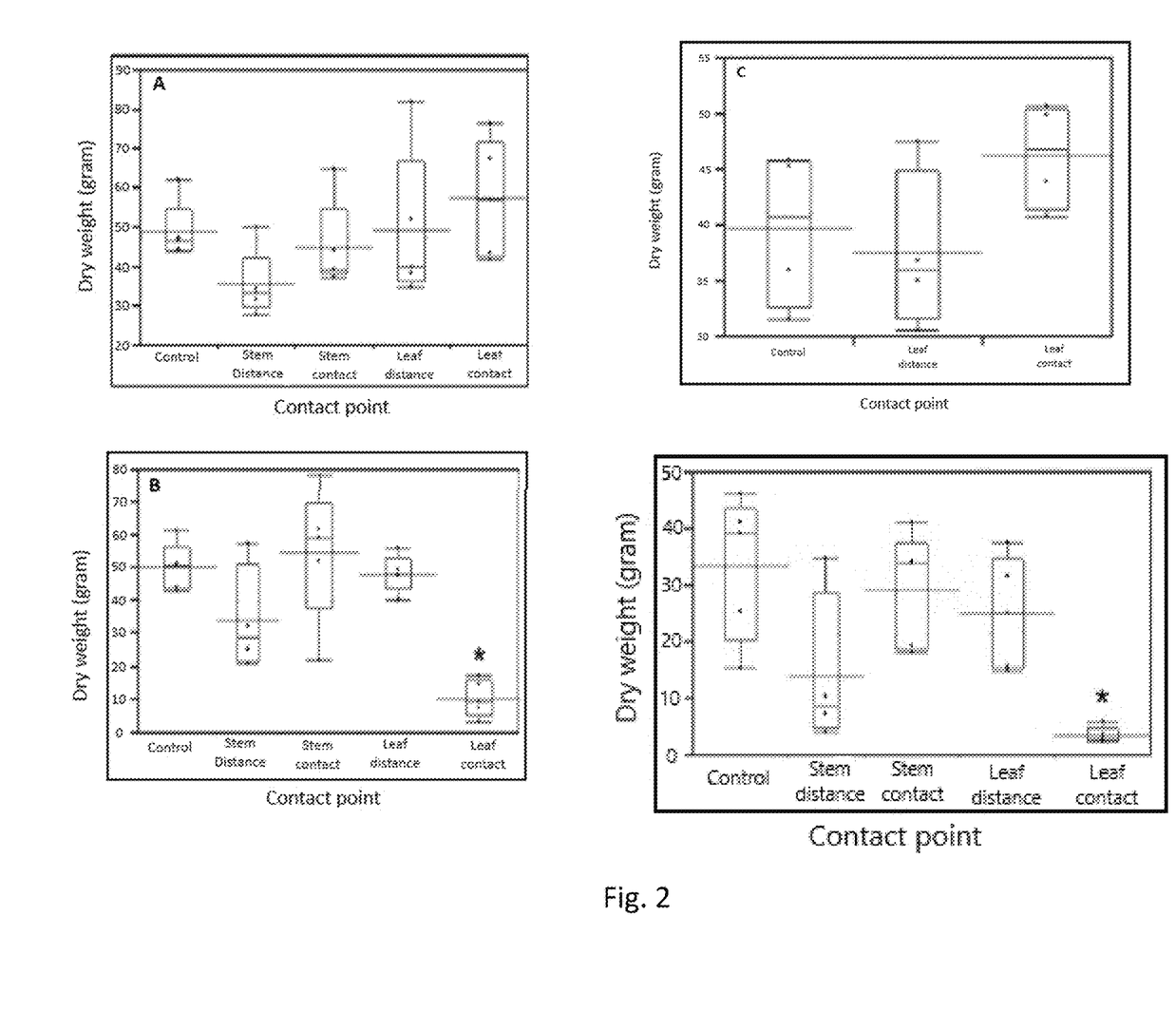
FIG. 2 is a representation of the impact of contact point on dry weight (biomass) of various plants.

FIG. 2 illustrates a representation of the impact of contact point on dry weight (biomass) of watermelon (A), common purslane (B), Johnson grass (C) and redroot pigweed (D). The results revealed that common purslane and redroot pigweed can be highly affected by the treatment. For the aforementioned, the dry weight was reduced from 50 to 8.5 and from 33 to 3 g/plant respectively when the direct contact treatment was applied.

Figure 3:
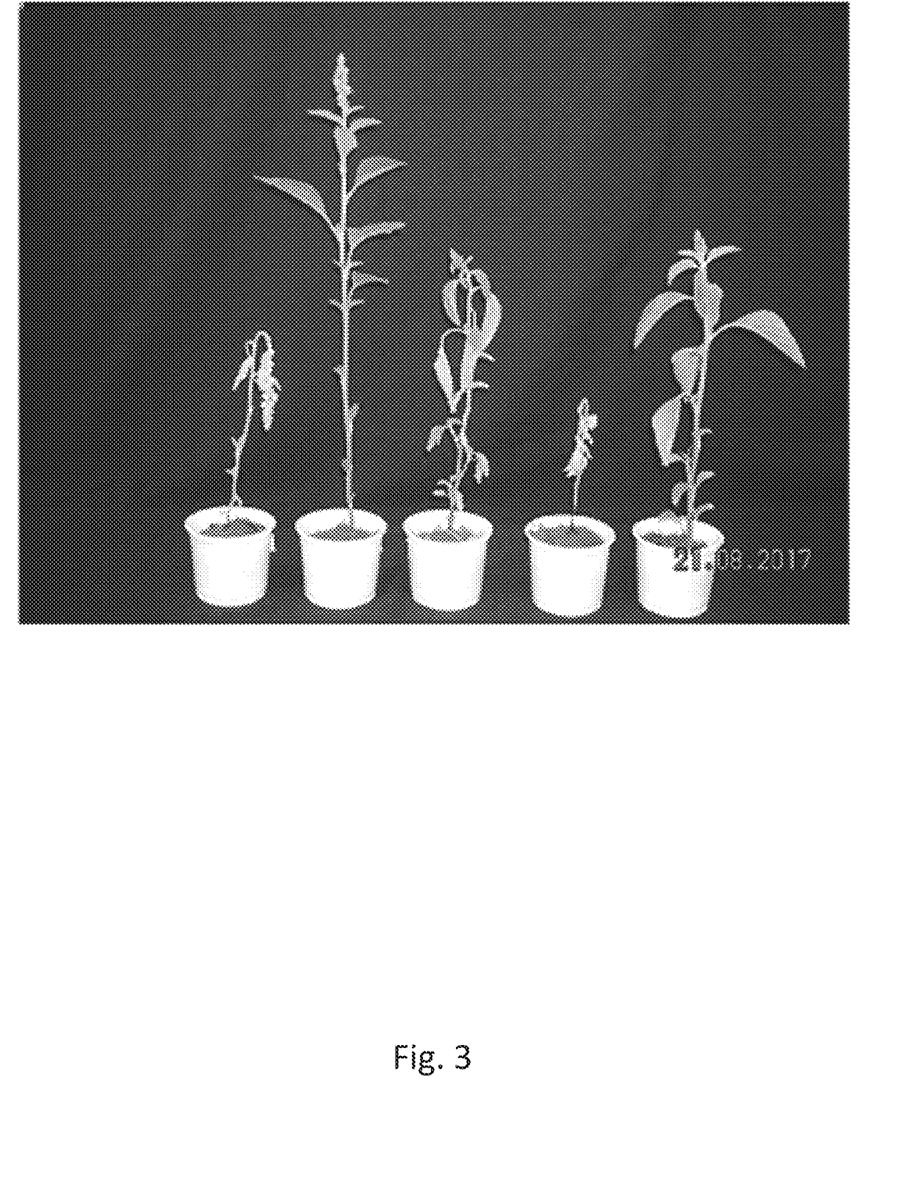
FIG. 3 is a pictorial example to the impact of the tested treatments on redroot pigweed.

FIG. 3 show a pictorial example to the impact of the tested treatments on redroot pigweed. Images were taken two weeks after the treatment and before the biomass evaluations. The treatments included (from left to right): stem distance electrostatic treatment, stem contact electrostatic treatment, leaf distance electrostatic treatment, leaf contact electrostatic treatment and non-treated control. As the figure shows, the direct leaf treatment was highly effective and plant growth was completely stunted. Furthermore, the browning on the bottom parts of the stem after the direct leaf treatment can be clearly observed, pointing to the damage caused to the stem and hence the effectiveness of the treatment. Even though the dry weight reduction that followed the distance stem treatment was not significant compared to non-treated control, the impact of the treatment on the plant growth can still be observed.

Meaning that the in the time that past between the treatment and the dry matter examination, the dry matter of dead and a live plants did not change much. The dry matter shows what is the biomass of a plant, dead or alive, we expect that dead plant will not continue to grow and therefore will not increase their dry matter, in comparison to a living plants that continue to grow. However the dry matter itself do not show if the plant is dead or a live Example 2

Figure 4:
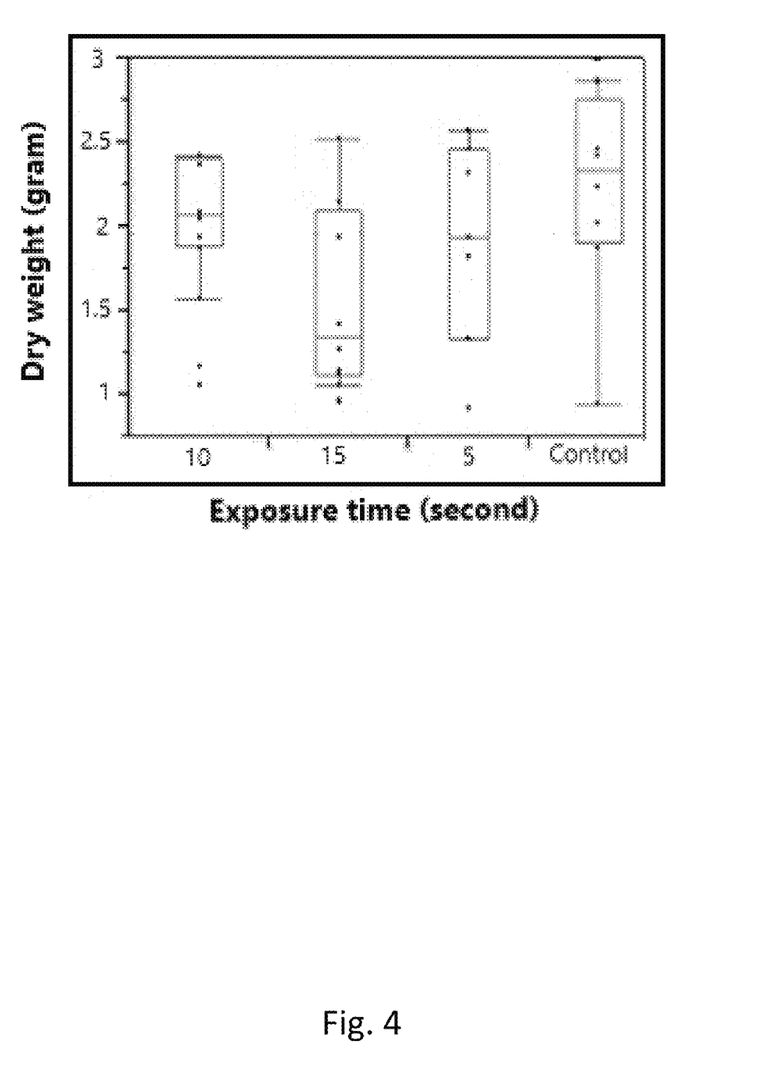
FIG. 4 is a representation of the impact of different exposure times on the dry weight of a common purslane plant.

Experiment 2 revealed that exposure time has no impact on any of the plant species examined in this experiment. Different exposure times were used without any measurable difference to the outcome. FIG. 4 illustrates a representation of the impact of different exposure times on the dry weight of a common purslane plant. FIG. 4 shows the dry weight values for the common purslane plant following 5, 10 and 15 second treatments. There was no significant distinction between the affect of the treatment on the plant for the different durations of exposure.

Figure 5:
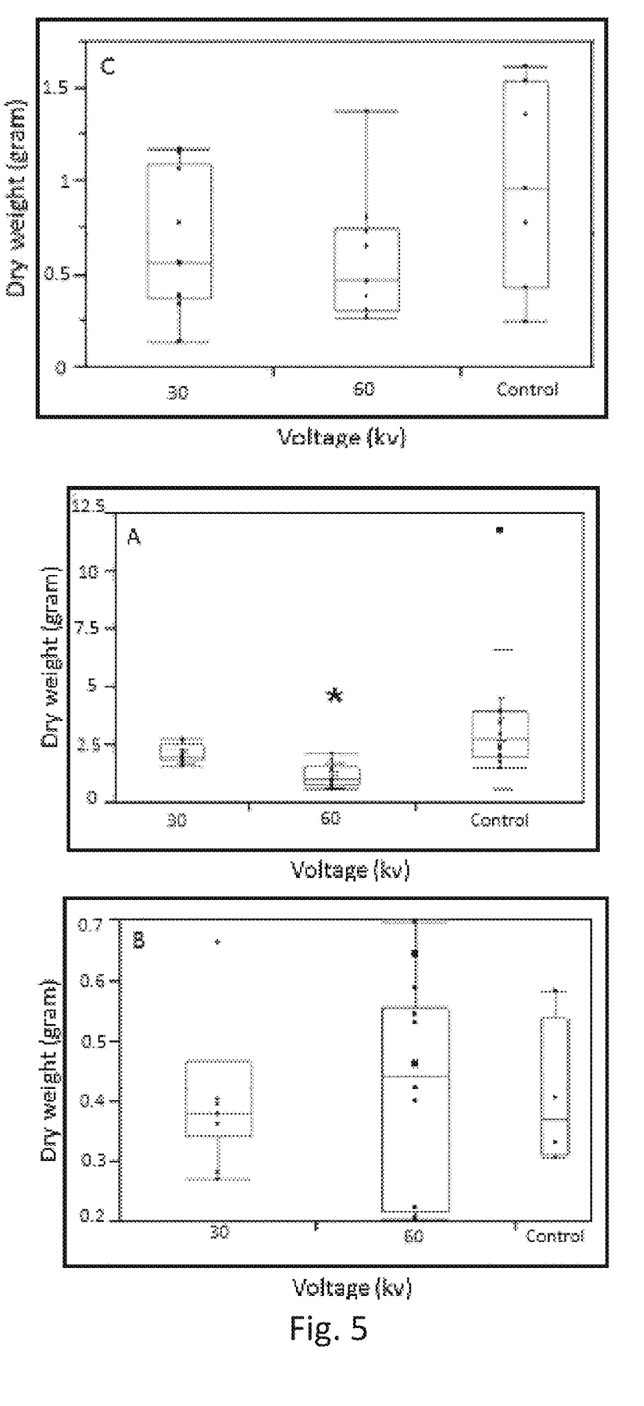
FIG. 5 is a representation of the impact of the voltage value on the dry weight of various plants.

The aforementioned notwithstanding, it was observed that, in the case of the common purslane plant, the voltage level of the treatment did influence the plant development and resulting dry weight. FIG. 5 illustrates a representation of the impact of the voltage value on the dry weight of: common purslane (A), Johnson grass (B), and redroot pigweed (C). At 40 kV the dry weight of the plant was significantly decreased from 3.5 g/plant in the control to 1.1 g/plant on average for the treated plants.

Example 3

Figure 6:
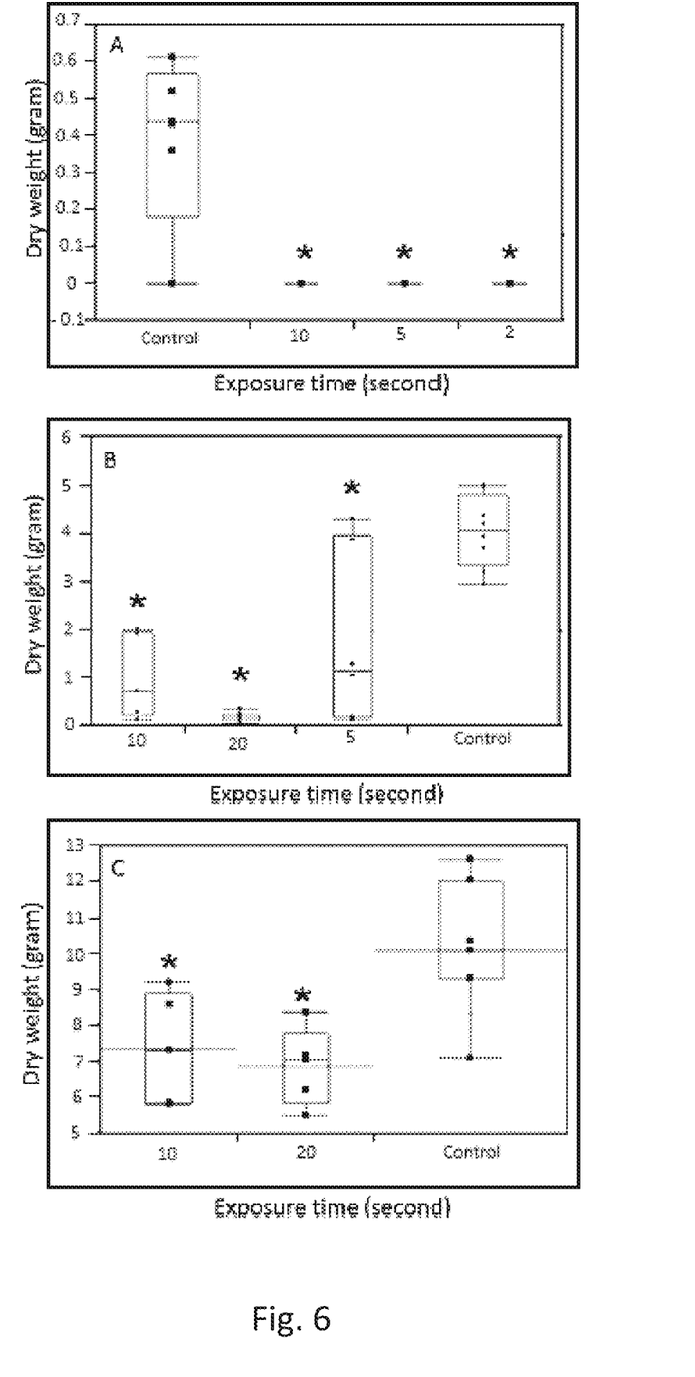
FIG. 6 is a representation of the impact of the exposure time on the dry weight of red clover plants at various growth stages.
Figure 7:
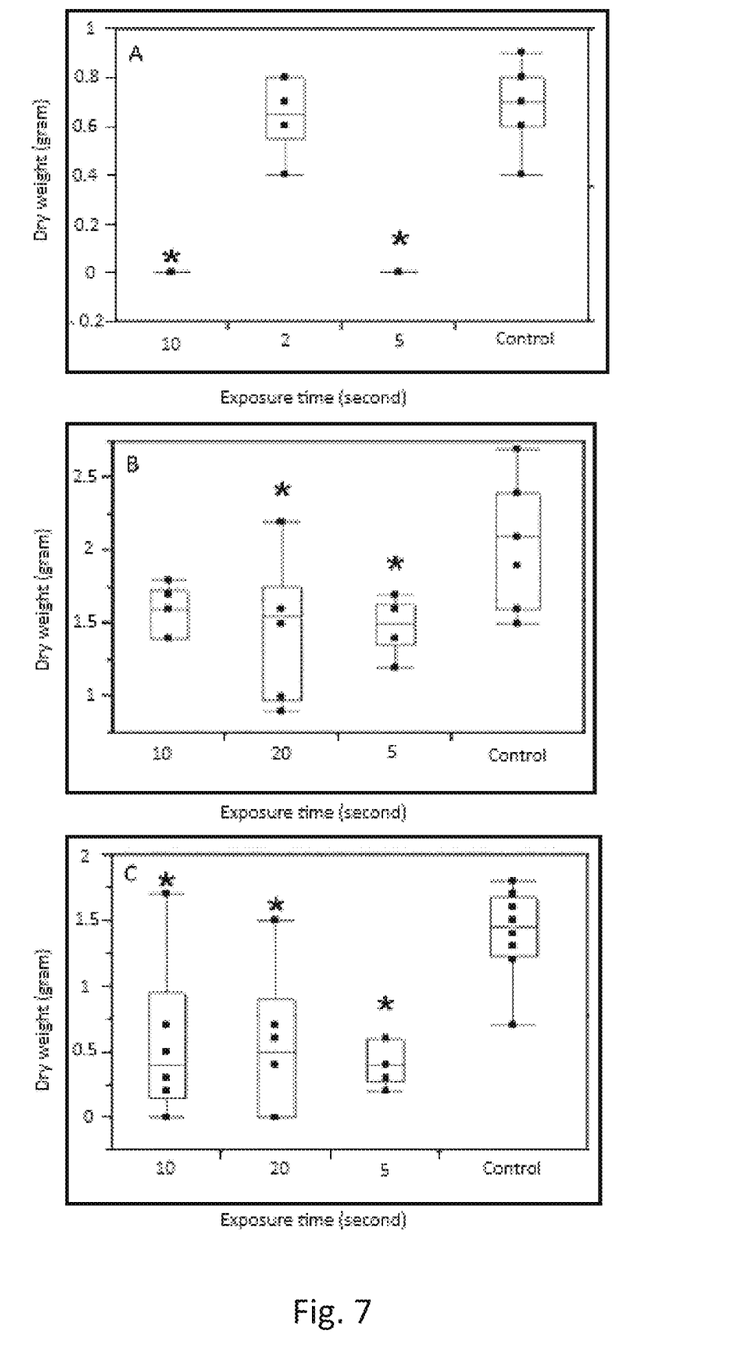
FIG. 7 is a representation of the impact of the exposure time on dry weight of rigid ryegrass plants at various growth stages.
Figure 8:
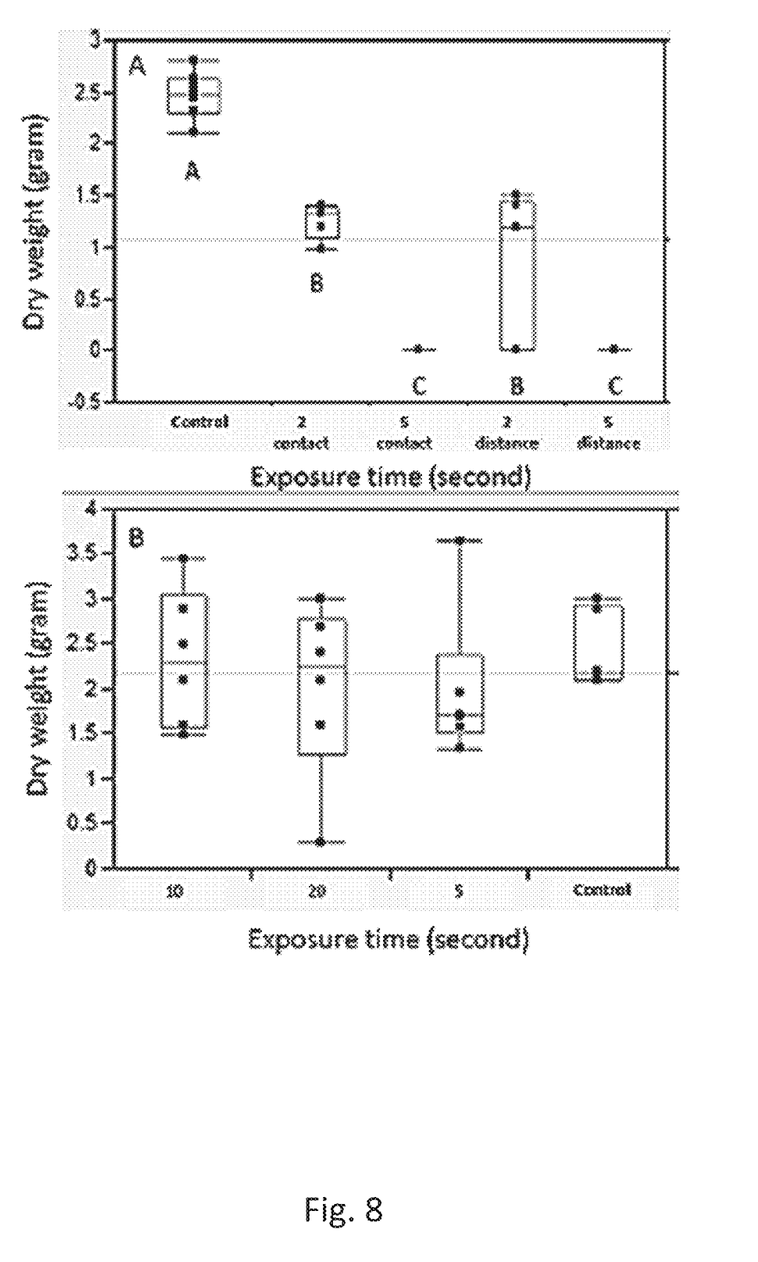
FIG. 8 is a representation of the impact of the exposure time and application method on the dry weight of mustard plants at various growth stages.

Experiment 3 examined different exposure times in different growing stages: 2, 4 and 6 weeks from planting, and on three weed species: mustard, rigid ryegrass and red clover. FIG. 6 depicts a representation of the impact of the exposure time on the dry weight of red clover plants at growth stages of two weeks (A), four weeks (B), and six weeks (C) after planting. FIG. 7 depicts a representation of the impact of the exposure time on dry weight of rigid ryegrass plants at growth stages of two weeks (A), four weeks (B), and six weeks (C) after planting. FIG. 8 depicts a representation of the impact of the exposure time and application method on the dry weight of mustard plants at growth stages of two weeks (A), four weeks (B), and six weeks (C) after planting.

FIGS. 6, 7 and 8 show that the exposure time and the growth stage influenced the plant development but the response of each weed species was different. The results indicate that red clover is the most sensitive weed to the electrostatic treatment. Referring to FIG. 6, which details the results for the red clover plants, it was observed that for all exposure times and growing stages there was a significant reduction of the dry weight in comparison to the non-treated control. All plants at the growth stage of two weeks were completely controlled and the dry weight was zero for all exposure times. For plants at growth stage of four weeks, exposure time of 20 seconds lead to complete control and dry weight of ~0 of all plants. For exposure time of 5 seconds, the average dry weight was 0.1 g/plant in comparison to 1.9 g/plant in the non-treated control. In plants at growth stage of six weeks, exposure time of 10 and 20 seconds reduced the dry weight by approximately 30% in comparison to the non-treated control.

Referring to FIG. 7, it was observed that rigid ryegrass was more resistant to the electrostatic treatment at the growth stage of two weeks, and only exposure time of 5 seconds and more resulted in 100% dry weight reduction compared to non-treated plants (complete control). However, for growth stages of four and six weeks, all exposure times significantly reduced the dry weight in comparison to the non-treated control, by 66% and 25% respectively.

Referring to FIG. 8, it was observed the mustard weeds were only affected by the electrostatic treatment at the growth stages of two weeks. An exposure time of 5 seconds significantly reduced the dry weight of the mustard weed. However, there was no significant difference to the dry weight or damage of the plant at the four and six week growth stages. At the aforementioned growth stages, exposure times of 2 or 5 seconds, for the different application methods (direct contact with the plant or at a distance of few centimeters between the plants and the electrode) made no significant difference on average.

Example 4

In experiment 4, the impact of soil moisture was examined. Table 2 shows that growth stage had no impact on the resultant dry weight of the weed (e.g., control level), but in high moisture content the dry weight was significantly lower (better control level). Nonetheless, differences were negligible between soil moisture treatments, 1% and 3% for the high and low levels, respectively.

TABLE 2

| Soil Moisture | |
| --- | --- |
| Main effect | Dry weight (% of control) |
| Growth stage (GS) | |
| 2 weeks after planting | 2 A |
| 4 weeks after planting | 1 A |

TABLE 2-continued

Soil Moisture

| Main effect | Dry weight (% of control) |
|---|---|
| Soil moisture (SM) | |
| High | 1 B |
| Low | 3 A |
| ANOVA | |
| GS | 0.2849 |
| SM | 0.0210 |
| GS × SM | 0.9729 |

The characters are used as statistical symbolling meaning that all treatment with the same letter are not significantly different. In this case the dry weight of high soil moisture is significantly different from the dry weight of all other treatments or tests The instant system and method for weeding has a number of interesting characteristics and advantages over known methods. Some of these characteristics and advantages are discussed below. Any advantages not discussed below that are implicit from the description herein or explicitly mentioned elsewhere herein are also considered of note. Any future understanding of the process and/or advantages of the invention not realized at this time and/or heretofore unobserved results of the instant method are considered within the scope of the invention.

The two most common forms of weeding are manual weeding and the use of chemicals for weed control. The instant method and system necessitates interaction with the weed plant (direct or nearby touch). As such, the method affords selective weeding, according to the efforts of the person performing the instant weed control activity.

Weed plants treated according to the instant method die in place and revert to organic matter as they decompose. Weeds are unwanted parasites that use up valuable resources from the same ground that the desirable plants are nourished from.

According to the instant method, weeds that die and decompose, return the stolen nutrients to the soil for the desired plants to enjoy.

Herbicides are commonly used to kill weeds. Some herbicides are selective—killing only weeds and not desirable plants—while other herbicides are non-selective and kill any plant life they come in contact with. Strong chemical herbicides and fungicides can end up polluting drinking water, groundwater, and surface water. The chemicals can also remain in the soil and be inculcated into produce grown therein. The effects of herbicides etc. on produce are still unclear, but it is clear that having no chemical herbicides is a better alternative. Furthermore, some weeds become resistant to herbicides (especially tailor-made herbicides intended to kill weeds and not harm produce plants). As a result, the chemical combinations have to be updated from time to time, and usually become more and more complex, as each mutation occurs in the weeds. The electrostatic shock treatment according to the instant innovation is completely chemical free. The weeds cannot develop a defense against the instant treatment.

The weed plant suffers multi-systemic injury from the shock. Cells inside the plant that are composed, inter alia, of water burst open. The water pressure inside plant cells is called turgor pressure, and it is maintained by a process called osmosis. Technically speaking, osmosis is the movement of water across a differentially permeable membrane from a place where water concentration is higher to one where the concentration is lower. The cell membrane is differentially permeable, meaning that water molecules can enter, but the salt molecules are too large to escape. The result is that water pressure builds inside the cell, causing the cell membrane to exert pressure on the cell wall. The rigid cells keep the plant upright, the stems rigid and leaves expanded to the sunlight. When the cells burst, the plant loses internal pressure and the plant wilts and dies.

The electrostatic treatment affects the plant from the leaves all the way down to the roots. Accordingly, plant is not able to regenerate. As a result, in the next weeding cycle, there will be fewer weeds to contend with. After a few cycles, the soil will be weed free, except for weeds that are brought in from outside the treated area (e.g. by the wind, animals, birds etc.).

The instant method is highly advantageous with respect to the chemical and manual methods. For example, the most environmentally friendly way to get rid of weeds is to pull them up, dig out the roots, let them dry in the sun (at best, the dried roots can be placed on a compost or mulch pile). This method is time consuming, and labor intensive. Furthermore, very often part of the stem or root breaks off from the plant during removal and remain in the ground. As a result, the weed will simply regrow or even multiply during the next growth cycle. By contrast, the instant method includes a two-second application of the electrode to the plant. The entire plant is affected and dies where it stood, with no chance of rejuvenating or multiplying.

According to embodiments, the device is handheld, e.g. the electrode is disposed on a handle. The handle may be of any length and design. A length and design that increases effectiveness and efficiency is obviously preferred. For example, an elongated handle (i.e. an arm) with the electrode disposed on the distal end (near the ground) and controls (if any) are embedded into the proximal end of the handle (i.e. the grip), where the device is held by the user. The elongated section of the handle (arm) may be of a set length or adjustable. For example, the arm may be telescopically extendable.

In preferred embodiments, the power source is a battery. Exemplarily, the power source can be secured in harness that is adapted to be worn by the user for increased mobility, portability and comfort. In embodiments, the battery is rechargeable. Tests have shown that a high voltage, low current shock produces the best results. However, devices confer high voltage, high current shocks, low voltage, high current shocks and low voltage, low current shocks are also within the scope of the invention.

Informal testing has shown that a mobile phone battery has sufficient energy to power an electrode according to the instant invention for one to two days of administering electrostatic shocks to between 1000 and 2000 weeds. A simplified calculation gives the approximate price per 1000 square meters at 15 US cents.

In embodiments, a multipronged apparatus can be used for treating an entire area of weeds, such as an overgrown back yard. The device can be used to indiscriminately treat a large number of plants at the same time. For example, the device can resemble a rake with a plurality of tines, each tine terminating in an electrode. The user rakes through the cluster of weeds, delivering shocks to multiple plants with each raking movement.

Thermal Imaging

An experiment was devised to provide a quantitative evaluation for the impact of the electrocution application on the temperature of the plant. Plants were treated at four weeks after seeding (WAS) stage while the electrode was placed directly on the leaf at all treatments. During electrocution, the plants were imaged using a thermal sensor.

Figure 9A:
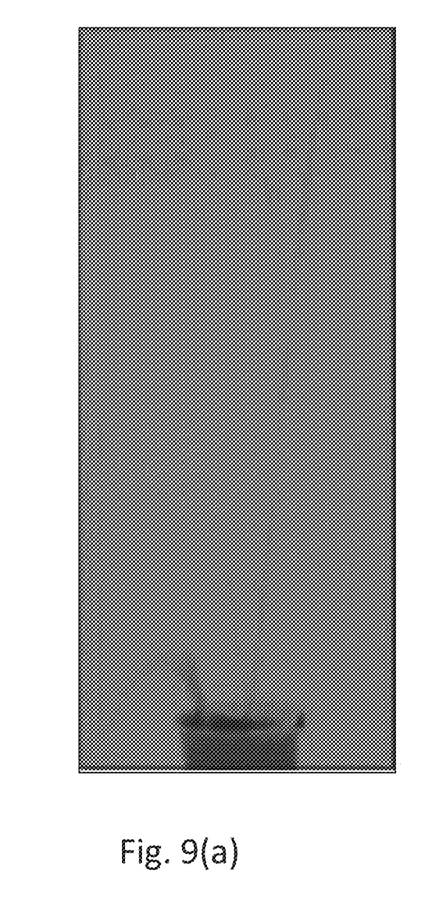
FIG. 9 is a depiction of temperatures of a plant over a time course: prior to, during and following the electrocution treatment.
Figure 9B:
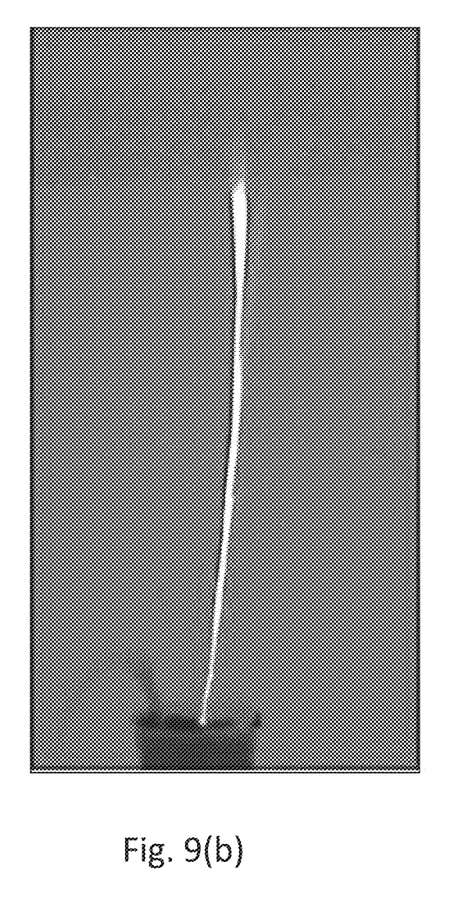
Figure 9C:
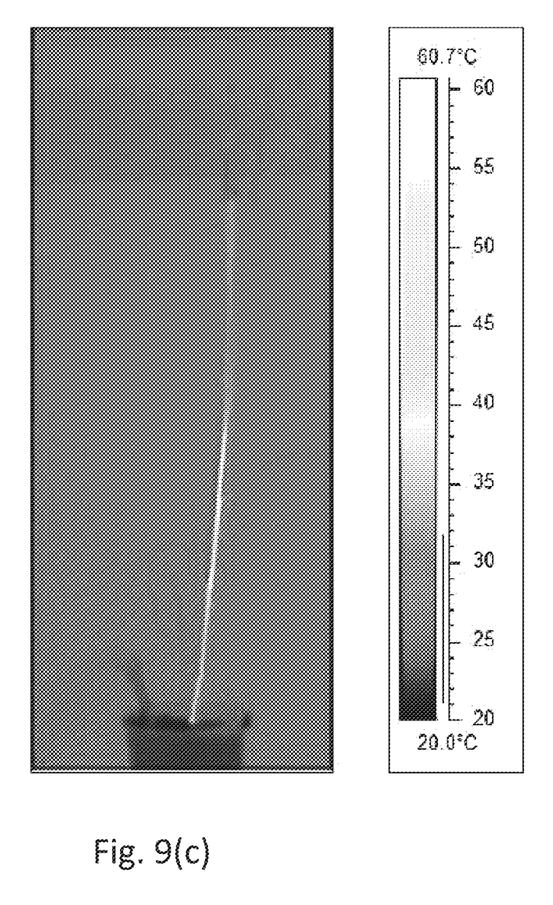

FIG. 9 is a depiction of temperatures of a plant over a time course: prior to, during and following the electrocution treatment. Before the treatment (FIG. 9(a)), the plant can barely be observed in the thermal image as its temperature is similar to the surrounding room, ~23° C., and both share identical blue hue. During the electrocution, the plant temperature is significantly increased, however, not all of the plant parts exhibit the same temperature (FIG. 9(b)). The upper parts of the plant show the highest temperatures reaching a value greater than 60° C., meaning, more than a 40° C. increase compared to the pre-treatment temperature. The bottom parts of the plant experience lower temperatures with values ranging from 35° C. to 40° C. Following the treatment (FIG. 9(c)) the plant gradually cools down, however, not all plant parts cool at the same rate. In this case, the upper parts cool first and areas where the temperatures were previously the highest, now reach values of ~28° C. Counter intuitively, the bottom parts are hotter compared to the upper parts with temperatures higher than ~35° C.

Table 4 demonstrates the impact of the contact point and electrocution duration on the plant's maximal temperature during the electrocution process. The table also depicts a comparison between grass and broad leaf weeds.

TABLE 4

| Species | Contact point | Time duration (seconds) | | Max. Temperature (° C.) | | |
| --- | --- | --- | --- | --- | --- | --- |
| | | Exposure | Arrive to max. | Lower | Middle | Upper |
| A. retraflexusonly | leaf | 20 | 6 | 66 | 67 | 70 |
| A. retraflexusonly | leaf | 40 | 8 | 70 | 71 | 73 |
| A. retraflexusonly | Stem | 20 | 20 | 51 | 41 | 28 |
| A. retraflexusonly | Stem | 40 | 15 | 71 | 46 | 26 |
| S. halepense | leaf | 40 | 20 | 45 | 60 | 70 |

The contact point seems to be a significant factor affecting the maximal temperatures that the plant reaches. For example, when A. retroflexusonly was treated for 20 seconds, the maximal temperatures at the middle part of the plants were 67 and 41° C. for the leaf and stem contact points, respectively (Table 4). Furthermore, the necessary time to reach the maximal temperature was lower for the leaf contact point compared to the stem, 6 and 20 seconds, respectively.

Higher electrocution duration resulted with higher maximal temperatures, however, with lower differences between the treatments compared to the contact point. For example, the middle part of A. retroflexusonly plants that were treated at the stem reached temperatures of 41 and 46° C. for 20 and 40 seconds, respectively.

The treated species also affected the maximal temperatures that the plants reached. Here, a comparison can be held between the 40 second leaf treatments, and as Table 4 shows, at the upper part of the plant next to the contact point, the maximal temperatures were similar, ~70° C. However, at the lower parts of the plants, differences between species become significant and at the bottom parts of A. retroflexusonly and *S. halepense* the maximal temperature were 70° C. and 45° C., respectively.

The control mechanism of weed-electrocution was assumed to be based on rapid heating of plant tissues. The thermal imaging and analysis allowed direct measurements of the plant temperatures and provided, for the first time, documentation of the exact temperature increase caused by electrocution. It showed a more than 40° C. increase, and in some parts of the plant the temperature reached ~70° C. Damage to the functionality of plant tissues following exposure to temperatures higher than 55° C. were previously reported.

Furthermore, images acquired before and during the treatment provided evidence for the longevity of the temperature increase in the plant tissue and its directionality. As the images show, temperature increase initiates at the contact point of the electrode with the leaf, and as the process goes on, the heat is transferred downward through the stem to the bottom parts of the plant, nonetheless, without affecting adjacent leaves.

Temperature saturation at the 40 seconds exposure duration compared to the 20 second exposure duration could be observed. The longer treatment did not always resulted in significantly higher plant temperature. This finding is of great interest for future development of electrocution systems as the exposure duration and the energetic demands can be optimized as a result of such observations.

Finally, the device is adapted to be user friendly, i.e. if a person accidentally receives an electrostatic shock from the innovative device, the shock will not be fatal. The current and voltage of the device are controlled so as to prevent administering a shock that would be fatal to a person.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for weed control, comprising:
   (a) providing an electrode coupled to a power source via a power provision arrangement; and
   (b) delivering an electrostatic shock to a single contact point on a weed plant via said electrode or even when said electrode is at a distance from a leaf or stem of the weed plant while maintaining a constant discharge between the electrode and the leaf or stem;
   wherein said electrode delivers a constant discharge between 35 and 45 kV of DC at a low current that is not fatal to humans, adapted to only cause the weed plant to lose turgor pressure by causing cells with water to burst.

2. The method of claim 1, wherein said electrode communicates an AC current.

3. The method of claim 2, further comprising:
   providing a DC current from said power source; and
   converting said DC current to said AC current by said power provision arrangement prior to delivering said electrostatic shock.

4. The method of claim 1, wherein said electrode communicates a DC current.

5. The method of claim 4, further comprising:
   providing an AC current from said power source; and
   converting said AC current to said DC current by said power provision arrangement prior to delivering said electrostatic shock.

6. The method of claim 1, wherein said electrostatic shock is delivered to a leaf or stem of said weed plant.

7. The method of claim 6, wherein said electrostatic shock is delivered by direct contact between said leaf or stem.

8. The method of claim 1, wherein said electrostatic shock is delivered for a duration of time between two seconds and twenty seconds.

9. The method of claim 1, wherein said electrostatic shock is delivered for two seconds.

10. The method of claim 1, wherein said electrostatic shock is delivered any time after emergence of said weed plant.

11. The method of claim 10, wherein said electrostatic shock is delivered at a growth stage of between two weeks and six weeks.

12. The method of claim 11, wherein said electrostatic shock is delivered at a growth stage of two weeks.

13. The method of claim 1, wherein said power source is selected from the group comprising: an electricity grid and a battery.

14. The method of claim 1, wherein said electrode delivers a shock of 40 kV of DC or 2500V of AC.

15. A device for performing electrostatic weeding, comprising:
   (a) an electrode;
   (b) a handle, coupled to said electrode; and
   (c) a power provision arrangement operationally coupled to a power source, said power provision arrangement being in electrical communication with said electrode;
   wherein said electrode is adapted to provide an electrostatic shock to a weed plant, adapted to only cause the weed plant to lose turgor pressure by causing cells with water to burst, so as to damage or destroy said weed plant, even when said electrode is at a distance from a leaf or stem of the weed plant while maintaining a constant discharge between the electrode and the leaf or stem of between 2000 V and 3000 V of AC at a low current that is not fatal to humans.

16. The device of claim 15, wherein said power provision arrangement includes an electrical cable.

17. The device of claim 16, wherein said power provision arrangement further includes a component selected from the group including: a transformer, a converter, and a combination thereof.

18. The device of claim 17, wherein said transformer is selected from the group of: an AC to AC transformer and a DC to DC transformer; and wherein said converter is selected from the group of: AC to DC converter and a DC to AC converter.

19. A method of using electrostatic shocks in the control of a weed population, comprising:
   (a) providing an electrode coupled to a power source via a power provision arrangement; and
   (b) providing an electrostatic shock to a weed plant via said electrode so as to damage or kill said weed plant, by causing the weed plant to only lose turgor pressure by causing cells with water to burst, wherein the electrostatic shock is provided even when said electrode is at a distance from a leaf or stem of the weed plant while maintaining a constant discharge between the electrode and the leaf or stem;
   wherein said electrode delivers a constant discharge between 2000 V and 3000 V of AC at a low current that is not fatal to humans.

* * * * *